United States Patent [19]

Takahashi et al.

[11] Patent Number: 4,790,182
[45] Date of Patent: Dec. 13, 1988

[54] HOT WIRE AIR FLOW METER

[75] Inventors: Minoru Takahashi; Hiroatsu Tokuda, both of Katsuta; Tadao Suzuki, Hitachi; Masumi Takada; Tsutomu Kooriyama, both of Katsuta, all of Japan

[73] Assignee: Hitachi, Ltd., Tokyo, Japan

[21] Appl. No.: 913,379

[22] Filed: Sep. 30, 1986

[30] Foreign Application Priority Data

Oct. 9, 1985 [JP] Japan .................. 60-223580

[51] Int. Cl.[4] .................. G01F 1/68; G01M 15/00
[52] U.S. Cl. .................. 73/204.21; 73/118.2; 73/202.5; 73/204.27
[58] Field of Search ............. 73/204, 27 R, 118.2; 338/262-266, 25

[56] References Cited

U.S. PATENT DOCUMENTS

| | | | |
|---|---|---|---|
| 971,101 | 9/1910 | Van Aller | 338/263 |
| 2,269,850 | 1/1942 | Hebler | 73/27 R |
| 2,287,460 | 6/1942 | Wagenhals et al. | 338/263 |
| 2,319,516 | 5/1943 | Phelps | 73/204 |
| 2,624,199 | 1/1953 | Boyer | 73/204 |
| 3,246,515 | 4/1966 | Martino et al. | 73/204 |
| 3,435,676 | 4/1969 | Bruckner et al. | 73/204 |
| 3,824,966 | 7/1974 | Schneider et al. | |
| 4,369,656 | 1/1983 | Ueno et al. | 73/204 |
| 4,400,974 | 8/1983 | Nishimura et al. | 73/204 |

FOREIGN PATENT DOCUMENTS

| | | |
|---|---|---|
| 0116144 | 8/1984 | European Pat. Off. |
| 0118117 | 9/1984 | European Pat. Off. |
| 3431952 | 3/1985 | Fed. Rep. of Germany |
| 0052462 | 9/1969 | German Democratic Rep. |
| 108907 | 8/1981 | Japan |
| 59-31412 | 2/1984 | Japan |
| 60-60521 | 4/1985 | Japan |

Primary Examiner—Herbert Goldstein
Attorney, Agent, or Firm—Antonelli, Terry & Wands

[57] ABSTRACT

A platinum wire (2) is wound in the form of coil. An outer surface of the coiled wire (2) is overcoated with a glass member (4). The coiled wire (2) is welded to supporting member (3). An exothermic resistor (1; 1A, 1B) comprised the coiled wire (12), the glass member (4) and the supporting member (3), and has no bobbin therein. Such an exothermic resistor (1; 1A, 1B) free from a bobbin is used as a hot wire element (1A) and a cold wire element (1B) in a hot wire air flow meter. The quantity of heat generated on the coiled wire (2) hardly transmit through the supporting member (3) and is carried away almost through air. The transient response characteristics under sudden change of an amount of air flow can be improved.

8 Claims, 3 Drawing Sheets

HOT WIRE AIR FLOW METER

BACKGROUND OF THE INVENTION

1. Field of the Invention

The present invention relates to a hot wire air flow meter and, more particularly, to a hot wire air flow meter for detecting an amount of intake air of an internal combustion engine.

2. Description of the Prior Art

It has previously been proposed to detect the amount of intake air being introduced to an internal combustion engine using a hot wire air flow meter having a bobbin. (Japanese Patent Laid-Open No. 31412/1984).

The hot wire air flow meter having a bobbin includes a bobbin made of ceramics etc, and a platinum wire forming an exothermic resistor wound in a coil form around the bobbin. A glass material is overcoated on the coiled platinum wire and lead wires are connected to the coiled platinum wire. A supporting member supports the bobbin and the glass coating member.

Quantities of heat for heating the bobbin of the hot wire air flow meter itself, which are also transmitted to the supporting members via the bobbin and the lead wires, cannot be neglected. For the existance of those quantities of heat, the transient response characteristics versus the fluctuation of the amount of air flow has a tendency to a delay. Because of the delay of the transient response characteristics, there is the disadvantage that a surging phenomenon occurs in an automobile under conditions of rapid acceleration and/or rapid deceleration of the automobile.

A hot wire air flow meter is installed generally within a bypass air passage, which bypasses the main air passage of the internal combustion engine. The hot wire air flow meter disposed within the bypass air passage has excellent anti-pulsation characteristics or accurate detection of mean flow of pulsation flow and also anti-backfire characteristics or high shock-resistance against backfire phenomenon.

Besides, it has been known that a platinum wire of an air flow meter may be stretched across a main air passage to form a loop. The platinum wire as the temperature sensitive resistor is held within a ring by spacers in the form of a loop. U.S. Pat. No. 3,824,966).

However, if the air flow meter having such a straight loop-formed platinum wire as shown in the above referenced U.S. Patent should be used in the bypass air passage, it would cause the following faults. Since the space of the bypass air passage is comparatively smaller than that of the main air passage, the length of the platinum wire in the form of a loop would be shorter and limited to a predetermined length. Because of such a shortness of the straight looped-formed platinum wire, the electric resistance value of the air flow meter will be relatively small, and so that output characteristics of the air flow meter may vary widely.

SUMMARY OF THE INVENTION

An object of the present invention is to provide a hot wire air flow meter wherein transient response characteristics under sudden change of an amount of air flow can be improved.

Another object of the present invention is to provide a hot wire air flow meter wherein carry-over time for final value can be improved.

A further object of the present invention is to provide a hot wire air flow meter wherein the surging phenomenon can be decreased.

Still another object of the present invention is to provide a hot wire air flow meter wherein an amount of heat conduction through a supporting member can be reduced.

According to the hot wire air flow meter of the prevent invention, the exothermic resistor is composed of the metal wire in a form of a coil and a glass material overcoating an outer surface of the coiled metal wire, except for the ends thereof, and the exothermic resistor has no bobbin.

The exothermic resistor is formed by a process of providing a core wire, winding a metal wire in the form of coil on the core wire, overcoating a glass material on the core wire and the metal wire, baking the glass material member, and removing the core wire such as by acid.

The exothermic resistor in the present invention is defined as a resistance element or a resistance probe, in which the resistance value thereof has a temperature dependence property.

In a hot wire air flow meter, such as exothermic resistor is used an air flow velocity measuring element and an air temperature measuring element. The air flow velocity measuring element is referred to generally as a hot wire element or a hot wire sensor, and the air temperature measuring element is referred to generally as a cold wire element or a cold wire sensor.

By using a hot wire air flow meter which has no bobbin, according to the present invention, the quantity of heat generated on the coiled metal wire of the exothermic resistor will hardly transmit through the supporting members or lead wires, and is carried away almost entirely through the air. Accordingly, the transient response characteristics, for example when the amount of air flow changes suddenly, can be improved drastically.

Since the outer surface of the coiled metal wire is overcoated by a glass material, the hot wire air flow meter of the present invention can attain an excellent corrosion resistance. Both end sides of the coiled metal wire may be wound with a lap winding, and so the hot wire air flow meter having no bobbin according to the present invention can provide an improved mechanical strength.

DETAILED DESCRIPTION OF THE PREFERRED EMBODIMENTS

Figure 1:
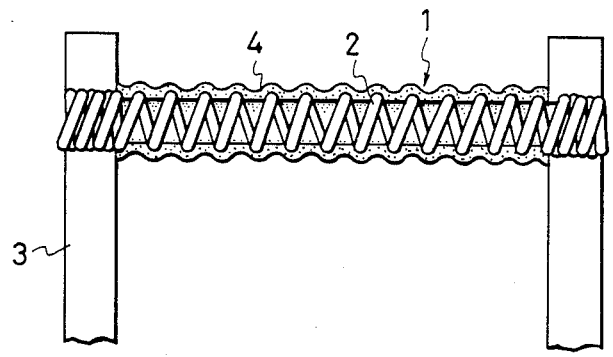
FIG. 1 is a structural view of an exothermic resistor according to one embodiment of the present invention.

There will be explained below in detail a hot wire air flow meter according to one embodiment of the present invention. FIG. 1 shows a structural view of an exothermic resistor which may be utilized in a hot wire air flow meter.

An exothermic resistor 1 for detecting an amount of intake air flow has a platinum wire 2 in the form of a coil and has no bobbin therein. The coiled platinum wire 2 has an outer diameter of about 20 μm and is about 5 mm long. The respective ends of the coiled platinum wire 2 are welded to two supporting members 3, respectively. An outer surface of the coiled platinum wire 2 is overcoated almost in the cylindrical form with an inorganic glass material 4 for the purpose of corrosion resistance and mechanical strength. The respective ends of the exothermic resistor 1 are not overcoated with the glass material 4 but remain unovercoated, and then are placed in a lap winding state in consideration of welded to the supporting member 3.

One example of a manufacturing method of the exothermic resistor 1 having no bobbin will be explained with reference to FIGS. 2a, 2b, 2c, 2d and 2e according to the order of manufacturing steps.

Figure 2A:
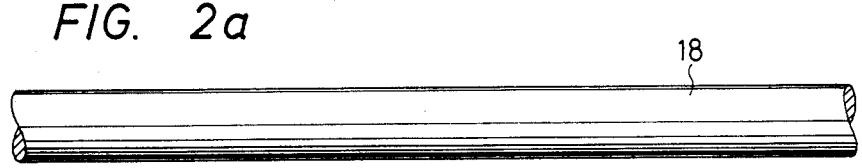
FIGS. 2a, 2b, 2c, 2d and 2e are diagrams showing steps of manufacturing of the exothermic resistor in the order of manufacturing, respectively.

FIG. 2a shows a structural view of a core wire 18. The core wire 18 is a straight molybdenum wire and having an outer diameter of about 0.5 mm. The molybdenum core wire 18 is used as a core wire for winding the platinum wire 2 on an outer surface thereof.

Figure 2B:
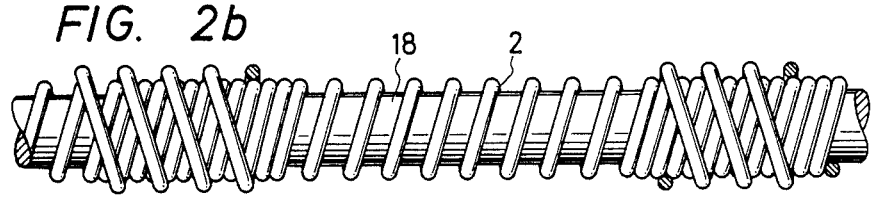

FIG. 2b shows platinum wire 2 in combination with the core wire 18. The platinum wire 2 is wound continuously over an outer surface of the molybdenum core wire 18 by means of a coil winding mechanism. At an interval of about 5 mm, the platinum wire 2 is wound in a close coiling state and also in a lap winding state.

Figure 2C:
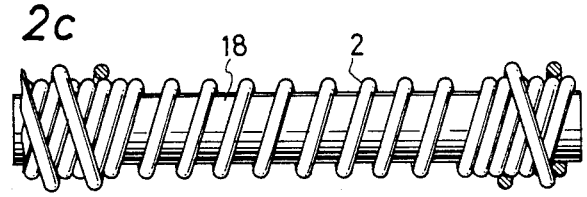

FIG. 2c shows one piece of the coiled platinum wire 2 being wound around on an outer surface of the molybdenum core wire 18. The single coiled platinum wire 2 in combination with the molybdenum core wire 18 is made by cutting the center of the lap winding portion at both sides so as to be about 5 mm length.

Figure 2D:
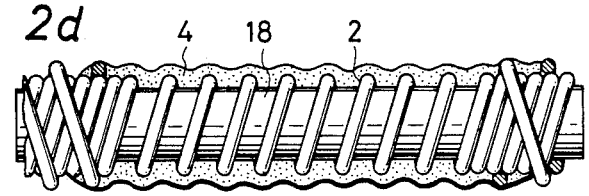

FIG. 2d shows both the molybdenum core wire 18 and the coiled platinum wire 2 being overcoated and baked by the inorganic glass material 4. The coiled platinum wire 2 is overcoated within the glass material member 4, except for the respective ends thereof.

Figure 2E:
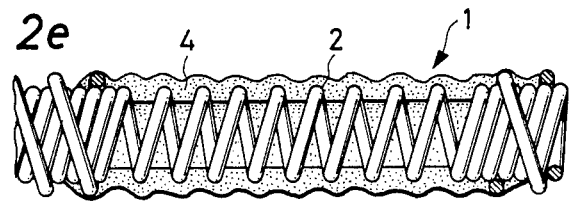

FIG. 2e shows the exothermic resistor 1 free from the bobbin. The exothermic resistor 1 is made by removing the molybdenum core wire 18 from the compound structure body shown in FIG. 2d using a mixed acid composed of a nitric acid and a sulfuric acid. Thus, the exothermic resistor 1 has no bobbin therein.

The exothermic resistor which is free from the bobbin 1 is welded to the supporting member 3 at both ends thereof. The exothermic resistor 1 may be welded to lead wires and then the lead wires may be connected to the supporting member 3.

The hot wire air flow meter having the above exothermic resistor 1 with no bobbin is disposed within a bypass air passage of the internal combustion engine. The above exothermic resistor 1 having no bobbin is used as an air flow velocity measuring element 1A and as an air temperature measuring element 1B with the same structure member. The air temperature measuring element 1B constitutes one of the components in the hot wire air flow meter.

Figure 3:
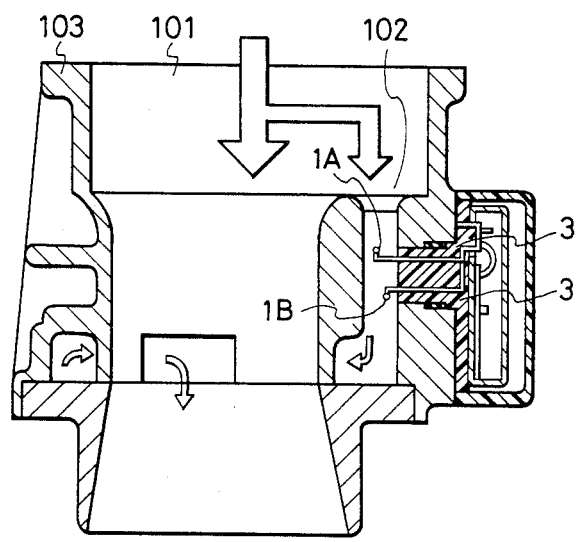
FIG. 3 is a sectional view of a body for an internal combustion engine having a hot wire air flow meter of the invention.

As shown in FIG. 3, the hot wire air flow meter having the air flow velocity measuring element 1A as a hot wire element and the air temperature measuring element 5 as a cold wire element is disposed in a bypass air passage 102 of the internal combustion engine. A body 103 of the internal combustion engine has a main air passage 101, and the bypass air passage 102 is branched from the main air passage 101. Most of the intake air passes through the main air passage 101 and a part of the intake air bypasses through the bypass air passage 102.

Figure 4:
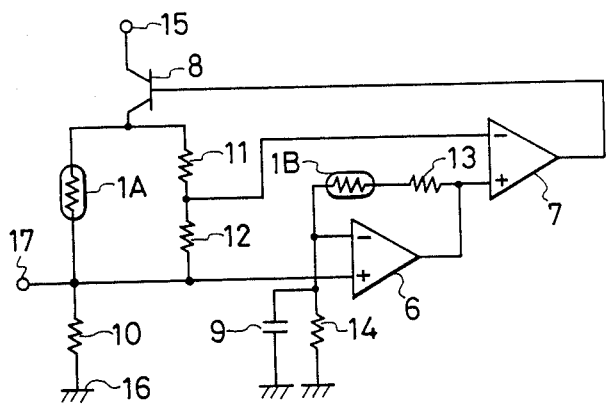
FIG. 4 shows an electric driving circuit for the hot wire air flow meter.

An electrical driving circuit of the hot wire air flow meter is illustrated in FIG. 4. The electric driving circuit is formed of the air flow velocity measuring element 1A, the air temperature measuring element 1B, operation amplifiers 6 and 7, a power transistor 8, a condensor 9, and resistances 10, 11, 12, 13 and 14. A collector terminal of the power transistor 8 connects to a plus pole of a battery, and a ground terminal of the resistance 10 connects to a minus pole of the battery, respectively. A connection junction 17 between the resistance 10 and the air flow velocity measuring element 1A connects to an input terminal of a microprocessor. The microprocessor controls the internal combustion engine utilizing an output signal of the hot wire air flow meter.

In the above electric driving circuit, the power transistor 8 supplies an electric current to the air flow velocity measuring element 1A and thereby the air flow velocity measuring element 1A is heated. The temperature of the air flow velocity measuring element 1A is controlled at all times at a predetermined temperature, which is higher than that of the temperature of the air temperature measuring element 1B. At this time, the air temperature measuring element 1B only carries a microcurrent, in which the quantity of the exothermic heat is negligibly small, and detects an intake air temperature. Such an air temperature measuring element 1B is used as an intake air temperature compensating member.

When the air flow contacts the air flow velocity measuring element 1A, a temperature difference between the air flow velocity measuring element 1A and the air temperature measuring element 1B is controlled at all times at a predetermined value by the operation of the electric driving circuit.

The above operation in the electric driving circuit acts to provide a feedback function so as to equalize at all times a voltage value equal to the voltage difference between one end of the air flow velocity measuring element 1A and another end thereof divided by resistances 11 and 12, and a voltage value equal to the voltage drop across the resistance 10 being amplified by the operation amplifier 7. The voltage drop across the resistance 10 is caused by the electric current flowing in the air flow velocity measuring element 1A.

When the amount of air flow varies, the electric current flowing in the air flow velocity measuring element 1A also varies. Therefore, the amount of the air flow can be measuring according to the voltage drop of the resistance 10 in response to the varied electric current.

By adopting the above construction of the hot wire air flow meter having no bobbin according to the present invention, the quantity of heat generated on the coiled platinum wire 2 of the air flow velocity measuring element 1A and the air temperature measuring element 1B is hardly transmitted through the supporting members 3 or lead wires, and is carried away almost entirely through the air.

In the above embodiment of the present invention, the quantities of heat required which are heating the bobbin and for carrying away through from the supporting members or lead wires via the bobbin, as shown in the air flow meter having a bobbin, decreases widely.

Accordingly, the transient response characteristics, for example when the amount of air flow changes suddenly, can be improved drastically.

Figure 5:
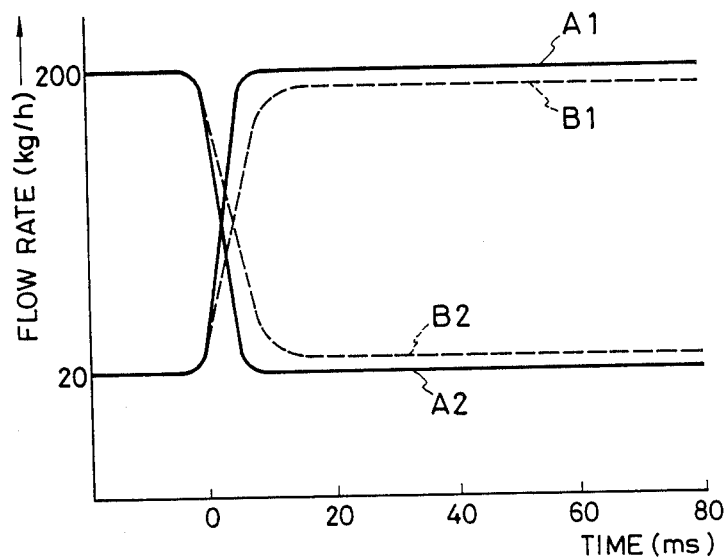
FIG. 5 shows response characteristics of the present invention and the prior art.

The response characteristics of the hot wire air flow meter having no bobbin according to the embodiment of the present invention is illustrated in FIG. 5. The test was carried out by means of a sonic test stand apparatus. The output voltage of the hot wire air flow meter represents the flow amount of air under the condition the amount of air flow has changed over.

In FIG. 5, curve A1 shows the hot wire air flow meter free from a bobbin according to the present invention, the curve B1 shows the hot wire air flow meter having a bobbin, when the amount of air flow is changed over from a low flow amount (about 20 kg/h) to a high flow amount (about 200 kg/h). Curve A2 shows the hot wire air flow meter free from a bobbin according to the present invention, and curve B2 shows the hot wire air flow meter having a bobbin, when the amount of air flow is changed over from a high flow amount (about 200 kg/h) to a low flow amount (about 20 kg/h). The hot wire air flow meter having no bobbin according to the present invention can provide an improved carry-over time for final value in comparison with the hot wire air flow meter having a bobbin as provided in the prior art.

By the above improvement in the structure, even under conditions of rapid acceleration and/or rapid deceleration, the hot wire air flow meter according to the present invention provide an output signal which will comply with a real change in the amount of air flow. Therefore, a suitable injection amount of the fuel injector can be determined and the problem of the surging phenomenon can be solved.

Further, as the structure of the exothermic resistor used as the air flow velocity measuring element and as the air temperature measuring element is simplified in that the bobbin is eliminated, the productivity of the exothermic resistor can be improved and the exothermic resistor can be provided at a low price.

Since the outer surface of the coiled platinum wire is overcoated by the inorganic glass material, the hot wire air flow meter of the present invention can provide an excellent corrosion resistance. Since both ends of the coiled platinum wire are wound with a lap winding, the hot wire air flow meter having no bobbin will provide an excellent mechanical strength.

In the above embodiment of the present invention, the platinum wire is described as being a metal wire, however a tungustin wire can be used and it can be expected to show the same effect as described for use of the platinum wire.

What is claimed is:

1. In the bypass air passage of an internal combustion engine, a hot wire air flow meter, comprising a resistor for measuring an amount of air flow in said bypass air passage formed in an air intake passage, and an electric driving circuit for controlling application of an electric current to said resistor and for providing a signal as an output voltage which provides an indication of a measured amount of air flow, said resistor being composed of a platinum wire in the form of coil and an outer surface of the coiled platinum wire being overcoated with a glass material except for portions at the respective ends thereof, so that said coiled platinum wire overcoated with glass material forms a hollow core in which there is no bobbin and in which the coiled platinum wire is embedded in the inner surface of the hollow core, whereby the inner surface of said coil is exposed.

2. A hot wire air flow meter according to claim 1, characterized in that said resistor is an air flow velocity measuring element and an air temperature measuring element.

3. A hot wire air flow meter for use in automobiles according to claim 1, characterized in that said resistor is in the form of a rod and is supported by supporting members at the respective ends thereof.

4. A hot wire air flow meter for use in automobiles, comprising a resistor for measuring an amount of air flow in a bypass air passage formed in an air intake passage, and an electric driving circuit for controlling application of an electric current to said resistor and for providing a signal as an output voltage which provides an indication of a measured amount of air flow, said resistor being composed of a platinum wire in the form of coil and an outer surface of the coiled platinum wire being overcoated with a glass material except for portions at the respective ends thereof, and said resistor having a hollow core in which there is no bobbin, characterized in that the coiled platinum wire forming said resistor is wound with a lap winding at the respective ends thereof, and portions of the lap winding are welded to respective supporting lead wires.

5. A hot wire air flow meter for use in automobiles, comprising a resistor for measuring an amount of air flow in a bypass air passage formed in an air intake passage, and an electric driving circuit for controlling application of an electric current to said resistor and for providing a signal as an output voltage which provides an indication of a measured amount of air flow, said resistor being composed of a platinum wire in the form of coil and an outer surface of the coiled platinum wire being overcoated with a glass material except for portions at the respective ends thereof, and said resistor having a hollow core in which there is no bobbin, characterized in that the coiled platinum wire forming said resistor is wound with a lap winding at the respective ends thereof, and portions of the lap winding of the coiled platinum wire are welded to respective supporting members.

6. A hot wire air flow meter for use in automobiles, comprising a resistor for measuring an amount of air flow in a bypass air passage formed in an air intake passage, and an electric driving circuit for controlling application of an electric current to said resistor and for providing a signal as an output voltage which provides an indication of a measured amount of air flow, said resistor being composed of a platinum wire in the form of coil and an outer surface of the coiled platinum wire being overcoated with a glass material except for portions at the respective ends thereof, and said resistor having a hollow core in which there is no bobbin, characterized in that the coiled platinum wire of said resistor is wound densely on the both end sides thereof, and the densely wound portions of the coiled platinum wire are welded to lead wires.

7. A hot wire air flow meter for use in automobiles, comprising a resistor for measuring an amount of air flow in a bypass air passage formed in an air intake passage, and an electric driving circuit for controlling application of an electric current to said resistor and for providing a signal as an output voltage which provides an indication of a measured amount of air flow, said resistor being composed of a platinum wire in the form of coil and an outer surface of the coiled platinum wire being overcoated with a glass material except for portions at the respective ends thereof, and said resistor having a hollow core in which there is no bobbin, characterized in that the coiled platinum wire of said resistor is wound densely on the both end sides thereof, and the densely wound portions of the coiled platinum wire are welded to supporting members.

8. In the bypass air passage of an internal combustion engine, hot wire air flow meter, comprising a resistor for measuring an amount of air flow in said bypass air passage formed in an air intake passage of a body, an electric driving circuit for controlling application of an electric current to said resistor and for producing a signal as an output voltage which provides an indication of a measured amount of air flow, said resistor being composed of a platinum wire in the form of coil, said resistor having a rod-like form and being supported by supporting members at the respective ends thereof, and an outer surface of the coiled platinum wire being overcoated with a glass material except for portions at the respective ends thereof, said resistor having a central axial hole therein, and a wall peripheral portion of the hole is formed by an inner peripheral portion of the coiled platinum wire, whereby the inner surface of said coil is exposed.

* * * * *